(12) United States Patent
Mann et al.

(10) Patent No.: US 6,742,126 B1
(45) Date of Patent: May 25, 2004

(54) METHOD AND APPARATUS FOR IDENTIFYING A DATA COMMUNICATIONS SESSION

(75) Inventors: Joseph F. Mann, Los Gatos, CA (US); Mingqi Deng, Mountain View, CA (US); Thomas Anthony Roden, Irvine, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/414,386

(22) Filed: Oct. 7, 1999

(51) Int. Cl.[7] ................... G06F 11/30; G06F 12/14; H04L 9/00
(52) U.S. Cl. ................... 713/201; 713/156; 713/188
(58) Field of Search ................... 713/201, 156, 713/188

(56) References Cited

U.S. PATENT DOCUMENTS

| | | | |
|---|---|---|---|
| 4,962,532 A | 10/1990 | Kasiraj et al. | 380/25 |
| 5,003,595 A | 3/1991 | Collins et al. | 380/25 |
| 5,033,076 A | 7/1991 | Jones et al. | 379/67 |
| 5,163,147 A | 11/1992 | Orita | 395/600 |
| 5,241,594 A | 8/1993 | Kung | 380/4 |
| 5,241,599 A | 8/1993 | Bellovin et al. | 380/21 |
| 5,351,136 A | 9/1994 | Wu et al. | 358/440 |
| 5,416,842 A | 5/1995 | Aziz | 380/30 |
| 5,421,006 A | 5/1995 | Jablon et al. | 395/575 |
| 5,440,635 A | 8/1995 | Bellovin et al. | 380/25 |
| 5,655,077 A | 8/1997 | Jones et al. | 395/187.01 |

(List continued on next page.)

FOREIGN PATENT DOCUMENTS

WO   99/53408   4/1999   .......... G06F/15/16

OTHER PUBLICATIONS

"Access Control Product Information", Ascend Communications, Inc., 4 pages.

Alexander, S., "DHCP Options and BOOTP Vendor Extensions," Network Working Group, RFC 1533. Oct. 1993.

Bellare et al., "Keying Hash Functions for Message Authentication", 1996, Advances in Cryptology–Crypto 96 Proceedings, Lecture Notes in Computer Science, vol. 1109, N. Koblitz ed., Springer–Verlag.

(List continued on next page.)

*Primary Examiner*—Gilberto Barron
*Assistant Examiner*—Courtney D. Fields
(74) *Attorney, Agent, or Firm*—Thelen Reid & Priest, LLP; David B. Ritchie

(57) ABSTRACT

A method and apparatus for using a session identifier to identify a specific data communications session between an apparatus and an external apparatus is disclosed. When a data communications session is initiated between the apparatus and an external apparatus, the external apparatus sends authenticating information to the apparatus. The apparatus uses the authenticating information to determine the identity and the privileges of the external apparatus for the particular session. A unique session identifier is created by the apparatus, and the session identifier is associated with the external apparatus's identity and privileges. The session identifier is passed between the apparatus and the external apparatus with each subsequent data communication in the session until the session is terminated. The apparatus uses the session identifier received with the data communications to identify the external apparatus and its privileges and allocate resources accordingly. The session identifier is encoded using a six bit code, thereby making it compatible with the Internet e-mail protocol and while also optimizing data compression. The encoded session identifier may be transmitted by appending it to a URL like a query string.

44 Claims, 3 Drawing Sheets

U.S. PATENT DOCUMENTS

| | | | | |
|---|---|---|---|---|
| 5,671,354 | A | 9/1997 | Ito et al. | 395/187 |
| 5,680,461 | A | 10/1997 | McManis | 380/25 |
| 5,684,950 | A | 11/1997 | Dare et al. | 395/187.01 |
| 5,708,780 | A | 1/1998 | Levergood et al. | 395/200.12 |
| 5,764,772 | A | 6/1998 | Kaufman et al. | 380/30 |
| 5,793,763 | A | 8/1998 | Mayes et al. | 370/389 |
| 5,815,665 | A | 9/1998 | Teper et al. | 395/200 |
| 5,835,727 | A | 11/1998 | Wong et al. | 395/200.68 |
| 5,845,070 | A | 12/1998 | Ikudome | 395/187.01 |
| 5,898,780 | A | 4/1999 | Liu et al. | 380/25 |
| 5,918,016 | A | 6/1999 | Brewer et al. | 709/229 |
| 5,933,625 | A | 8/1999 | Sugiyama | 395/557 |
| 5,944,824 | A | 8/1999 | He | 713/201 |
| 5,987,232 | A | 11/1999 | Tabuki | 395/187 |
| 5,991,802 | A | 11/1999 | Allard et al. | 709/219 |
| 5,991,810 | A | 11/1999 | Shapiro et al. | 709/229 |
| 6,006,334 | A | 12/1999 | Nguyen et al. | 713/202 |
| 6,011,910 | A | 1/2000 | Chau et al. | 395/200 |
| 6,021,496 | A | 2/2000 | Dutcher et al. | 713/202 |
| 6,023,698 | A * | 2/2000 | Lavey et al. | 707/10 |
| 6,041,357 | A * | 3/2000 | Kunzelman et al. | 709/228 |
| 6,044,155 | A | 3/2000 | Thomlinson et al. | 380/49 |
| 6,047,376 | A | 4/2000 | Hosoe | 713/201 |
| 6,092,196 | A | 7/2000 | Reiche | 713/200 |
| 6,141,687 | A | 10/2000 | Blair | 709/225 |
| 6,154,751 | A | 11/2000 | Ault et al. | 707/201 |
| 6,549,612 | B2 * | 4/2003 | Gifford et al. | 379/67.1 |

OTHER PUBLICATIONS

Bellovin, Steven M., "Problem Areas for the IP Security Protocols", Jul. 22–25, 1996, Proceedings of the Sixth Usenix UNIX Security Symposium, San Jose, CA.

Cisco User Control Point, pp. 1–4, printed from http://www.cisco.com/warp.public/728/ucp/ucp ds.htm om Sep. 10, 1998.

IPSec Network Security, pp. 1–69, printed from http://www.cisco.com/univercd/cc/td/doc/products/software/ios113ed/113t/113t3/ipsec.

Krawczyk, Hugo, "SKEME: A Versatile Secure Key Exchange Mechanism for Internet", 1996, IEEE, Proceedings of the 1996 Symposium on Network and Distributed Systems Security.

Patel, B., et al., "Securing L2TP using IPSEC", May 1998, PPPEXT Working Group, pp. 1–10, printed from http://www.masinter.net/~12tp/ftp/draft–ietf–pppext–12tp–security–02.txt. on Sep. 21, 1998.

"Remote Access Network Security", Ascend Communications, Inc., printed from http://www.ascend.com/1103.html, on Jul. 24, 1998, pp. 1–8.

Rigney, et al., "Remote Authentication Dial In User Service (RADIUS)", Network Working Group, RFC 2138, Apr. 1997, pp. 1–57.

Carrel, D. et al. The TACACS+ Protocol, version 1.78, Cisco Systems, Inc., printed from ftp://ftp–eng.cisco.com/gdweber/tac–rfc.1.78.txt on Oct. 23, 2000.

* cited by examiner

METHOD AND APPARATUS FOR IDENTIFYING A DATA COMMUNICATIONS SESSION

BACKGROUND OF THE INVENTION

1. Field of the Invention

The present invention relates to identifying data communications over the Internet. More particularly, the invention relates to a method and apparatus for creating and using unique session identifiers for identifying individual data communications sessions between one apparatus and another.

2. Background

Security on the Internet is important to ensure the integrity of business transactions and the transfer of confidential information. Since existing means of personal identification, such as visual appearance and written signatures, are not exactly transferable to Internet transactions, new digital methods of identification must be employed. These new methods must not only provide positive identification, they must themselves be secure to prevent interlopers from misappropriating the identifying information.

Such identification schemes must comport themselves with protocols for Internet data communications that are in existence. For example, the Internet e-mail protocol described in RFC 822, published under the auspices of the Internet Architecture Board, dictates that binary data should not be sent as eight-bit code. That is, the most significant bit (MSB) of each byte of transferred data must have a "0" value or else transmission errors may occur. Common schemes for addressing this issue include transmission as seven-bit ASCII code, base64 encoding, universal resource locator (URL)-encoding, and hex encoding. These methods, in turn, are limited by considerations such as character compatibility with the underlying message and decoding scheme, bandwidth and data storage requirements, and limitations imposed at the application level. A further consideration is the computational ease of encoding and decoding, e.g. powers of two encoding such as base64 can use shift/and operations while non-powers of two encoding such as base62 encoding must use division/modulus operations.

Identification schemes may also take advantage of existing data transmission methods. Form submission is commonly used to send information from one apparatus or computer to another apparatus or computer. The first computer provides the second computer with on-screen buttons and dialog boxes with which the user of the second computer can enter data. After the data is entered into the second computer, the data is encoded for transmission and sent to the first computer. If the data is relatively short, it may be directly appended to the URL in the header of the message to the first computer, separated by a "?". Data following the "?" is known as the query string, which is often limited in length because of the input buffer size of many servers. This method is known as GET mode. In an alternative method known as POST mode, longer data is sent in the body of the message to the first computer. Since information sent via either the GET or the POST method is usually primarily text, these transmissions are typically URL-encoded.

Data transmission sessions between computers may use GET or POST transmitted data to identify a particular data communications session. For example, an external computer or client may submit its identifying information by GET mode, and the URL-encoded identifying information may be appended to the URL for the duration of the session. This URL-encoded identifying information is then passed between the computers for the duration of the session.

There are shortcomings to this technique. For example, when identifying information is not adequately modified before being used to identify a session, the identification may not be unique to a session. In this case, if two computers submit identical identifying information during overlapping sessions resulting in identical URL-encoded identifying information, a host computer or server will not be able to differentiate between external computers.

Another shortcoming is that URL-encoding is inefficient for non-text characters. While letters and digits are encoded with one byte per character, other characters require three bytes. Thus, if the URL-encoded identifying information is not almost exclusively characters, it will require extra bandwidth and storage capacity. In some cases, URL-encoding may undesirably truncate or otherwise limit the identifying information.

The method and apparatus of this invention overcome these shortcomings.

BRIEF DESCRIPTION OF THE INVENTION

A method and apparatus for using a session identifier to identify a specific data communications session between an apparatus and an external apparatus is disclosed. When a data communications session is initiated between the apparatus and an external apparatus, the external apparatus sends authenticating information to the apparatus. The apparatus uses the authenticating information to determine the identity and the privileges of the external apparatus for the particular session. A unique session identifier is created by the apparatus, and the session identifier is associated with the external apparatus's identity and privileges. The session identifier is passed between the apparatus and the external apparatus with each subsequent data communication in the session until the session is terminated. The apparatus uses the session identifier received with the data communications to identify the external apparatus and its privileges and allocate resources accordingly. The session identifier is encoded using a six bit code, thereby making it compatible with the Internet e-mail protocol, while also optimizing data compression. The encoded session identifier may be transmitted by appending it to a URL like a query string.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons having the benefit of this disclosure.

This invention comprises a method and apparatus for identifying data communications sessions between two apparatuses. The apparatuses are typically computers, and are sometimes referred to as such in this disclosure. The computer which creates the session identifier may be referred to as the server, or simply the computer. The computer from which the authenticating information is provided may be referred to as the client or the external computer or the external apparatus.

Figure 1:
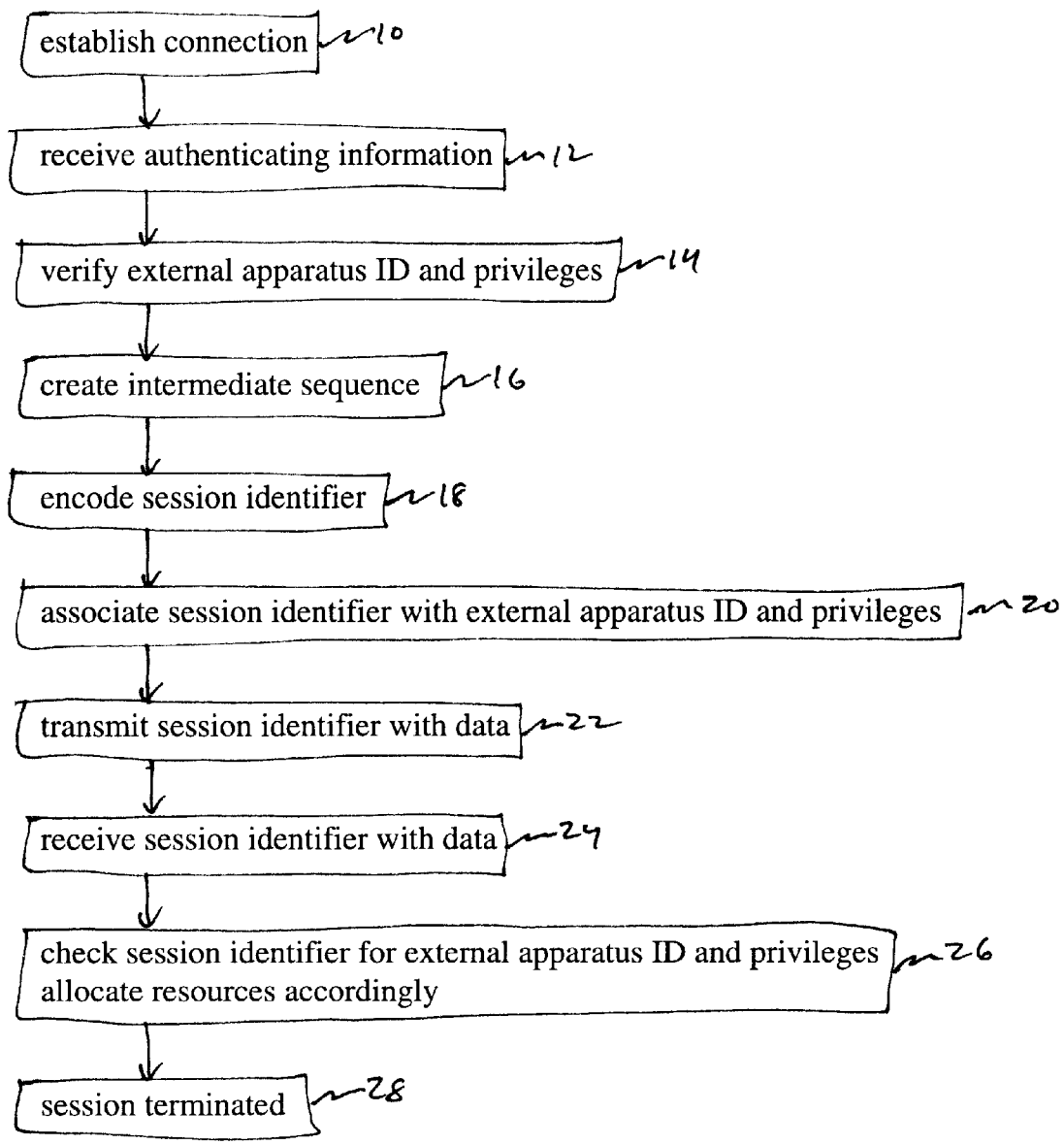
FIG. 1 illustrates a method of creating and using a session identifier.

FIG. 1 shows the sequence of events in creating and using a session identifier. At 10, a connection is established between the client and the server. The communications between client and server, from the time the connection is established until the time the connection is terminated, are referred to as a session.

Near the beginning of a session, the client transmits authenticating information which is received by the server 12. The authenticating information may be transmitted and received in a variety of forms, including GET and POST modes. The authenticating information may be received as one, two, or more separate sequences. These sequences may be combinations of user name, DNS addresses, cookies, passwords, token card sequences, or the like. Portions of authenticating information received by the server in GET or POST mode may have to be decoded from a URL-encoded format. The authenticating information is stored in memory of the server.

The server has existing memory that stores client identifications and client privileges associated with authenticating information. When the authenticating information is received, the server verifies the identity of the client and is able to assign appropriate privileges to the client for the particular session 14.

Authenticating information may be sent in a variety of ways including user names, IP addresses, cookies, passwords, token card sequences, or the like, or in combinations of these. The authenticating information may be transmitted in 7-bit code, such as in URL-encoded field submission. Such 7-bit code is compatible with the (original) Internet e-mail protocol as described in RFC 822. In one embodiment, transmission of at least part of the authenticating information is done in form submission using either GET or POST mode.

Once the authenticating information is stored in memory of the apparatus, the apparatus creates an intermediate sequence 16. The intermediate sequence is the precursor of the session identifier, and is represented as a binary sequence. The intermediate sequence is then encoded into the session identifier 18. The session identifier is associated with the current session between the computers and is stored in the memory of the server 20, such that the server can appropriately identify the client and control the privileges of the client for each session.

The intermediate sequence may be derived in a variety of ways. However derived, the intermediate sequence must be unique in order to fulfil its function. Therefore, if the intermediate sequence is derived in part from the authenticating information, there must be some component of the intermediate sequence that is separately derived, for example, from a random number generator. The intermediate sequence is referenced against the intermediate sequences of currently active session identifiers to guarantee uniqueness. Thus, when the intermediate sequence is encoded into a session identifier, the session identifier will truly be unique to the session. In this way, multiple external computers submitting identical authenticating information may conduct concurrent sessions with the apparatus with such sessions kept separate by virtue of having unique session identifiers. Also, separate sessions with a client submitting the same authenticating information for both sessions will have separate session identifiers.

Once encoded, the session identifier is transmitted to the client 22. In one embodiment, the session identifier is appended to a URL in conjunction with this transmission by a computer routine called a session identifier appended. After 22, the session identifier is transmitted by the client and received by the server along with each subsequent transmission of data from the client until the session is terminated. Reference number 24 shows the server receiving the session identifier along with a data communication. In one embodiment, the session identifier is appended to a URL in conjunction with such receiving by the server. Each time the server receives a data communication with a session identifier, the session identifier is checked to determine the identity and privileges of the client 26. Before the session identifier sent from the external computer to the computer is checked and verified, it may be referred to as a putative session identifier. This session identifier can be validated by referencing external information, e.g. network addresses.

Reference numbers 24 and 26 may be repeated, depending upon the number of data communications from the client to the server. Finally, the session is terminated 28. After termination of the session, the session identifier is invalidated by the server.

As previously stated, session identifiers may be created by the server in a variety of ways. In one embodiment, the computer processes the authenticating information into a binary sequence which appears to be random, and then adds additional sequence to the sequence derived from the authenticating information resulting in an intermediate sequence. In another embodiment, the entire intermediate sequence is randomly generated by the server. Regardless of how it is generated, the intermediate sequence is then encoded into a session identifier represented as a six-bit code or a seven-bit code.

Figure 2:
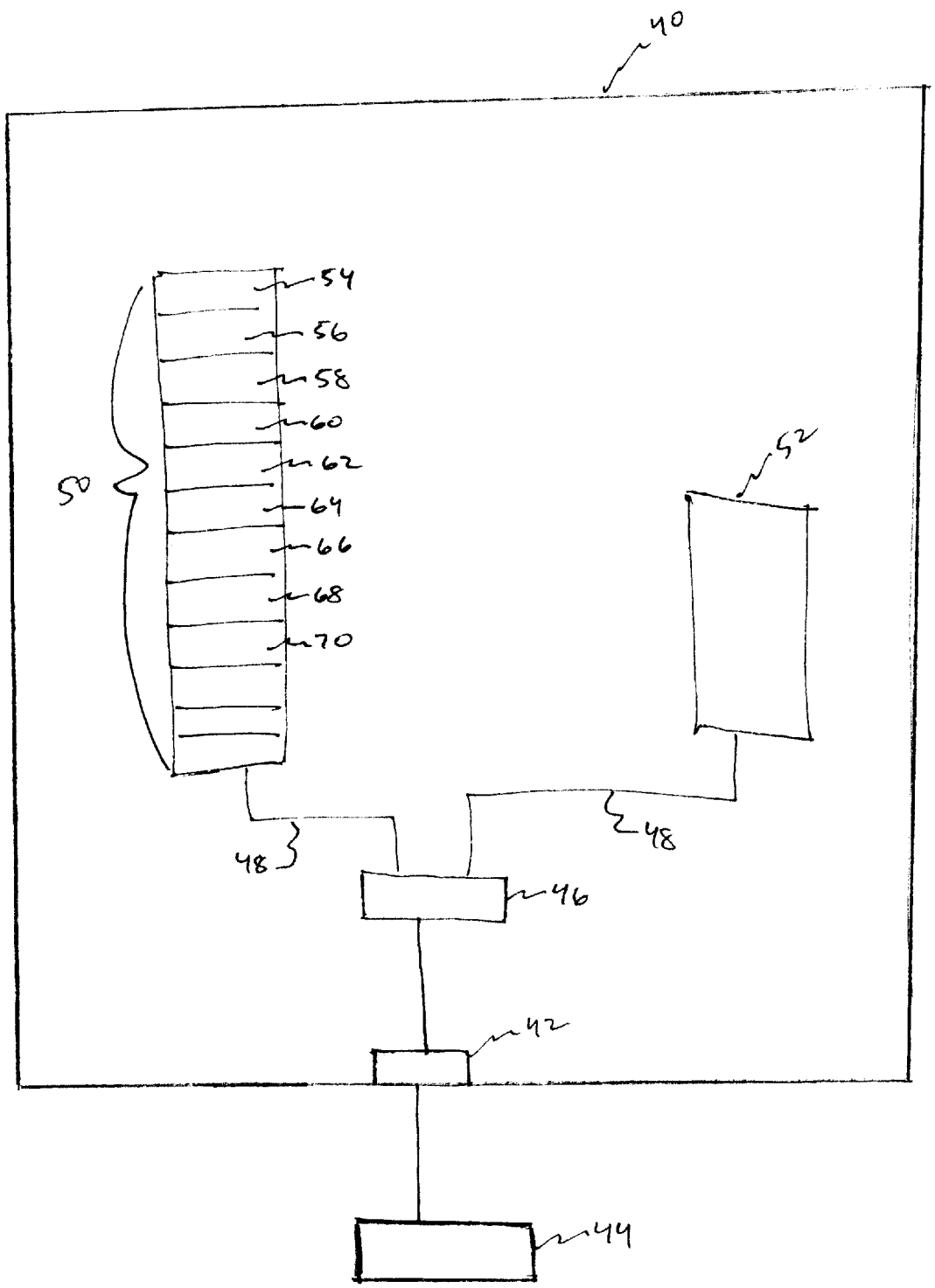
FIG. 2 illustrates an apparatus for creating and using a session identifier.

FIG. 2 is a block diagram of the apparatus 40. The apparatus includes a data communications port 42 for receiving data communications from, and transmitting data communications to, an external apparatus 44. The data communications port is connected to a processor 46, which manages incoming and outgoing communications as well as managing communications between components of the apparatus. The processer 46 is connected by busses 48 to memory storing components used in this invention 50 as well as to memory storing other resources 52. Within memory 50, a first location 54 stores data including associations between authenticating information, external apparatus identification, external apparatus privileges, and session information including the session identifier. Another location 56 stores authenticating information received from the external apparatus. A decoder 58 which decodes at least portions of the authenticating information from a URL-encoded format may be included. The decoder is a computer routine stored in memory 50. An external apparatus initiator 60 is a routine stored in memory 50. The external apparatus initiator compares authenticating information stored in 56 with data stored at 54. If the comparison indicates that the client is so privileged, the data communications session is allowed to proceed. A session identifier generator 62 creates a session identifier by first creating an intermediate sequence and then encoding the intermediate sequence into the session identifier. The session identifier generator 62 is a routine stored in memory 50. Once created, the session identifier is stored in memory 64, and information associating the session identifier, the session, the external apparatus, and the external apparatus privileges is stored in memory 54. If the session identifier is to be appended to a URL for transmission, a routine called a session identifier appender 66, which appends the session identifier to a URL is included in memory 50.

After the session identifier has been transmitted to the client, a putative session identifier is received from the client with each data communication. The putative session identifier is stored in memory 68. An external apparatus identifier 70 compares the putative session identifier 68 with the data at 54 to determine the client's privileges. Resources 52 are made available to the client in accordance with the client's privileges for the session.

Figure 3:
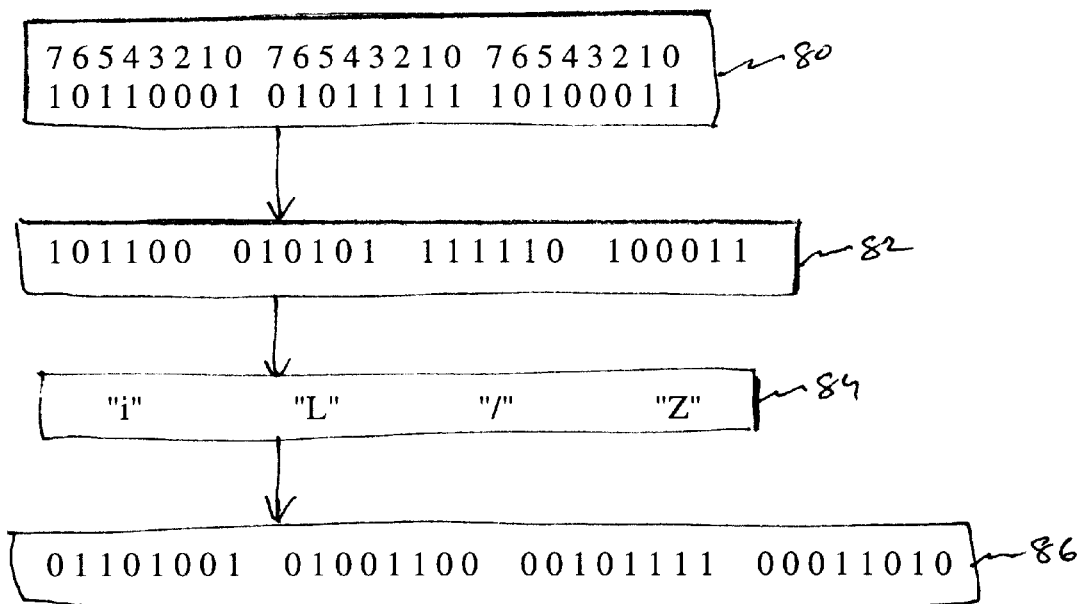
FIG. 3 illustrates an example of base64 encoding of a session identifier.

FIG. 3 shows a flow diagram of encoding a session identifier using a six-bit code. It will be appreciated that encoding using a seven-bit code may also be accomplished if sufficient characters are available to populate the character set. An intermediate sequence is generated as described above. Three exemplary bytes of an intermediate sequence with numbered bits are shown at 80. Intermediate sequence 80 contains instances where the MSB of each byte is not "0", making the code incompatible with the Internet e-mail protocol. To make sequence 80 compatible with the Internet e-mail protocol, the sequence is base64 encoded into binary sequence 86. Sequence 86 is suitable for transmission using the Internet e-mail protocol or other seven-bit protocols, and is referred to as the session identifier.

Base64 encoding is accomplished by dividing the intermediate binary sequence into 6-bit blocks 82, using a 64-character key to transform the 6-bit blocks into characters 84, and finally converting the characters to ASCII code 86. The standard base64 encoding key is "ABCDEFGHIJKLMNOPQRSTUVWXYZabcdefghijklmnopqrstuvwxyz0123456789+?". In a preferred embodiment demonstrated in FIG. 3, the character key for base64 code comprises the string "ABCDEFGHIJKLMNOPQRSTUVWXYZabcdefghi jklmnopqrstuvwxyz0123456789/:". This key differs slightly from standard base64 encoding in that the "+" symbol is substituted for by the "/" symbol and the "?" is substituted for by the ":" symbol, resulting in better URL compatibility.

The encoding method shown in FIG. 3 is generally applicable to create session identifiers from intermediate binary sequences, however the intermediate binary sequences may produced by the session identifier generator. In all cases, once it is created the session identifier is associated with the session, the external apparatus participating in the session, and the privileges of the external apparatus participating in the session.

It will be appreciated that the intermediate binary sequence 80 may by encoded by other six-bit or seven-bit encoding schemes to make the session identifier compatible with the Internet e-mail protocol. For example, six bit encoding schemes such as base36 using a character key such as "ABCDEFGHIJKLMNOPQRSTUVWXYZ0123456789" or base62 using a character key such as "ABCDEFGHIJKLMNOPQRSTUVWXY Zabcdefghijklmnopqrstuvwxyz0123456789" may be used. Seven bit schemes may also be employed if sufficient characters are available to populate the character key.

In one embodiment, the session identifier is conveniently appended to the URL which is transmitted to the external apparatus. Such appending is accomplished by a routine called a session identifier appender. Since the server creates the session identifier and originally appends it to the URL, it is unnecessary for the client to possess the details of the creation of the session identifier. After initially receiving the session identifier from the server, the client merely sends the session identifier to the server with each data communication, enabling the server to ascertain the client's identity and privileges for the particular session. The server may receive the session identifier appended to a URL.

This invention can be implemented by using a program storage apparatus readable by machine, tangibly embodying a program of instructions executable by the machine.

There are several advantages of the invention.

An important advantage of the invention is that the server is always aware of the privileges a client has for a particular session because of the uniqueness of the session identifier. This is true even when independent clients providing identical authenticating information originate from the same address or when a single client conducts concurrent sessions. The server can use this information to allocate its resources.

The server is also aware of the context of a particular session, allowing abbreviated commands to be made by the client or limited choices to be presented by the server.

Using the method and apparatus of this invention, if a third party posing as the client attempts to contact the apparatus during a session, the server will recognize that the third party is not the proper external client and respond accordingly. This feature helps prevent outside interference with communications which need to be secured.

The invention results in better utilization of bandwidth and lower storage requirements when using a session identifier being passed as a URL, appendage. Without the invention, the intermediate sequences generated as precursors to session identifiers may be URL encoded. However, on the average only 62 out of 256 bytes would be transmissible as one-byte ACSH1 characters. 184 out of 256 bytes would require three bytes to transmit. Thus, the average byte of intermediate sequence would result in 2.5 bytes of session identifier. Similarly, hex encoding of the intermediate sequence would require two bytes of session identifier per byte of intermediate sequence. However, using base64 encoding requires, on average, only 1.333 bytes of session identifier per byte of intermediate sequence. Still higher efficiencies may be achieved using seven-bit encoding schemes.

The invention is also useful to convert arbitrary length binary data into appropriate length representations. This compressibility of the session identifier is of particular value when there are limitations on the length of sequence that may be transmitted.

When the character key for base64 code comprises the string "ABCDEFGHIJKLMNOPQRSTUVWXYZabcdefghijklmnopqrstuvwxyz012345 6789/:" or similar strings, characters such as "+" and "?" are avoided. Characters such as "+" and "?" which have their own meaning in URL-encoding may be dangerous and result in the loss of data integrity in certain cases. Therefore, it is advantageous to encode the session identifier using a non-standard base64 character key.

While embodiments and applications of this invention have been shown and described, it would be apparent to those skilled in the art that many more modifications than mentioned above are possible without departing from the inventive concepts herein after a review of this disclosure. The invention, therefore, is not to be restricted except in the spirit of the appended claims.

What is claimed is:

1. A method for identifying a session of communication of binary data between an apparatus and an external apparatus, said method comprising:

receiving authenticating information from the external apparatus into the apparatus;

using the authenticating information to identify the external apparatus;

creating a session identifier associated with the session, the session identifier represented by a six-bit code;

transmitting the session identifier to the external apparatus;

receiving the session identifier along with each subsequent transmission of data from the external apparatus to the apparatus until the session is terminated; and using the session identifier to identify the external apparatus.

2. The method of claim 1, further comprising:

appending the session identifier to a URL prior to said transmitting and said receiving.

3. The method of claim 1, further comprising:

decoding at least portions of the authenticating information from a URL-encoded format.

4. The method of claim 1, wherein the six-bit code is a base64 code.

5. The method of claim 4, wherein the key for the base64 code comprises the string "ABCDEFGHIJKLMNOPQRSTUVWXYZabcdefghijkl mnopqrstuvwxyz0123456789/:".

6. An apparatus for identifying a session of communication of binary data to and from an external apparatus, comprising:

a first memory for storing associations among authenticating information, external apparatus identification information, and a session identifier;

a second memory for storing authenticating information received from the external apparatus;

an external apparatus initiator, said external apparatus initiator identifying the external apparatus by comparing the authenticating information with the associations stored in first memory;

a session identifier creator, said session identifier creator creating a session identifier;

a third memory for storing a session identifier, the session identifier represented by a six-bit code;

a fourth memory for storing a putative session identifier received from the external apparatus;

an external apparatus identifier, the external apparatus identifier identifying the external apparatus by comparing the putative session identifier with the associations stored in first memory.

7. The apparatus of claim 6, further comprising:

a session identifier appender, said session identifier appender appending the session identifier to a URL.

8. The apparatus of claim 6, further comprising:

a decoder, said decoder decoding at least portions of the authenticating information from a URL-encoded format.

9. The apparatus of claim 6, wherein the six-bit code is a base64 code.

10. The apparatus of claim 6, wherein the key for the base64 code comprises the string "ABCDEFGHIJKLMNOPQRSTUVWXYZabcdefghijkl mnopqrstuvwxyz0123456789/:".

11. A program storage device readable by a machine, tangibly embodying a program of instructions executable by the machine to perform a method for identifying a session of communication of binary data between an apparatus and an external apparatus, said method comprising:

receiving authenticating information from the external apparatus into the apparatus;

using the authenticating information to identify the external apparatus;

creating a session identifier associated with the session, the session identifier represented by a six-bit code;

transmitting the session identifier to the external apparatus;

eceiving the session identifier along with each subsequent transmission of data from the external apparatus until the session is terminated; and using the session identifier to identify the external apparatus.

12. A method for identifying a session of communication of binary data between an apparatus and an external apparatus, said method comprising:

receiving authenticating information from the external apparatus into the apparatus;

using the d authenticating information to identify the external apparatus;

creating a session identifier associated with the session, the session identifier represented by a seven-bit code;

transmitting the session identifier to the external apparatus;

receiving the session identifier along with each subsequent transmission of data from the external apparatus until the session is terminated; and using the session identifier to identify the external apparatus.

13. The method of claim 12, further comprising:

appending the session identifier to a URL prior to said transmitting and said receiving.

14. The method of claim 12, further comprising:

decoding at least portions of the authenticating information from a URL-encoded format.

15. An apparatus for identifying a session of communication of binary data to and from an external apparatus, said apparatus comprising:

a first memory for storing associations among authenticating information, external apparatus identification information, and a session identifier;

a second memory for storing authenticating information received from the external apparatus;

an external apparatus initiator, said external apparatus initiator identifying the external apparatus by comparing the authenticating information with the associations stored in first memory;

a session identifier creator, said session identifier creator creating a session identifier;

a third memory for storing a session identifier, the session identifier represented by a seven-bit code;

a fourth memory for storing a putative session identifier received from the external apparatus;

an external apparatus identifier, said external apparatus identifier identifying the external apparatus by comparing the putative session identifier with the associations stored in first memory.

16. The apparatus of claim 15, further comprising:

a session identifier appender, said session identifier appender appending the session identifier to a URL.

17. The apparatus of claim 15, further comprising:

a decoder, said decoder decoding at least portions of the authenticating information from a URL-encoded format.

18. A program storage device readable by a machine, tangibly embodying a program of instructions executable by the machine to perform a method for identifying a session of communication of binary data between an apparatus and an external apparatus, said method comprising:

receiving authenticating information from the external apparatus into the apparatus;

using the authenticating information to identify the external apparatus;

creating a session identifier associated with the session, the session identifier represented by a seven-bit code;

transmitting the session identifier to the external apparatus;

receiving the session identifier along with each subsequent transmission of data from the external apparatus until the session is terminated; and using the session identifier to identify the external apparatus.

19. The method of claim 1, wherein said creating comprises:

generating an intermediate sequence for the session identifier;

comparing the intermediate sequence with other intermediate sequences of currently active session identifiers to determine uniqueness; and encoding the intermediate sequence into the session identifier.

20. The method of claim 19, wherein the intermediate sequence is derived in part from the authentication information of the external apparatus.

21. The method of claim 19, wherein the intermediate sequence comprises a randomly generated sequence.

22. The apparatus of claim 6, wherein said session identifier creator comprises:

an intermediate sequence generator adapted to generate an intermediate sequence for the session identifier;

a determiner adapted to compare the intermediate sequence with other intermediate sequences of currently active session identifiers to determine uniqueness; and an encoder adapted to encode the intermediate sequence into the session identifier.

23. The apparatus of claim 22, wherein the intermediate sequence is derived in part from the authentication information of the external apparatus.

24. The apparatus of claim 22, wherein the intermediate sequence comprises a randomly generated sequence.

25. The program storage device of claim 11, wherein said creating comprises:

generating an intermediate sequence for the session identifier;

comparing the intermediate sequence with other intermediate sequences of currently active session identifiers to determine uniqueness; and encoding the intermediate sequence into the session identifier.

26. The program storage device of claim 25, wherein the intermediate sequence is derived in part from the authentication information of the external apparatus.

27. The program storage device of claim 25, wherein the intermediate sequence comprises a randomly generated sequence.

28. The method of claim 12, wherein said creating comprises:

generating an intermediate sequence for the session identifier;

comparing the intermediate sequence with other intermediate sequences of currently active session identifiers to determine uniqueness; and encoding the intermediate sequence into the session identifier.

29. The method of claim 28, wherein the intermediate sequence is derived in part from the authentication information of the external apparatus.

30. The method of claim 28, wherein the intermediate sequence comprises a randomly generated sequence.

31. The apparatus of claim 15, wherein said session identifier creator comprises:

an intermediate sequence generator adapted to generate an intermediate sequence for the session identifier;

a determiner adapted to compare the intermediate sequence with other intermediate sequences of currently active session identifiers to determine uniqueness; and an encoder adapted to encode the intermediate sequence into the session identifier.

32. The apparatus of claim 31, wherein the intermediate sequence is derived in part from the authentication information of the external apparatus.

33. The apparatus of claim 31, wherein the intermediate sequence comprises a randomly generated sequence.

34. The program storage device of claim 18, wherein said creating comprises:

generating an intermediate sequence for the session identifier;

comparing the intermediate sequence with other intermediate sequences of currently active session identifiers to determine uniqueness; and encoding the intermediate sequence into the session identifier.

35. The program storage device of claim 34, wherein the intermediate sequence is derived in part from the authentication information of the external apparatus.

36. The program storage device of claim 34, wherein the intermediate sequence comprises a randomly generated sequence.

37. An apparatus for identifying a session of communication of binary data between an apparatus and an external apparatus, said apparatus comprising:

means for receiving authenticating information from the external apparatus into the apparatus;

means for identifying the external apparatus using the authenticating information;

means for creating a session identifier associated with the session, the session identifier represented by a six-bit code;

means for transmitting the session identifier to the external apparatus;

means for receiving the session identifier along with each subsequent transmission of data from the external apparatus until the session is terminated; and means for identifying the external apparatus using the session identifier.

38. The apparatus of claim 37, wherein said means for creating comprises:

means for generating an intermediate sequence for the session identifier;

means for comparing the intermediate sequence with other intermediate sequences of currently active session identifiers to determine uniqueness; and means for encoding the intermediate sequence into the session identifier.

39. The apparatus of claim 38, wherein the intermediate sequence is derived in part from the authentication information of the external apparatus.

40. The apparatus of claim 38, wherein the intermediate sequence comprises a randomly generated sequence.

41. An apparatus for identifying a session of communication of binary data between an apparatus and an external apparatus, said apparatus comprising:

means for receiving authenticating information from the external apparatus into the apparatus;

means for identifying the external apparatus using the authenticating information;

means for creating a session identifier associated with the session, the session identifier represented by a seven-bit code;

means for transmitting the session identifier to the external apparatus;

means for receiving the session identifier along with each subsequent transmission of data from the external apparatus until the session is terminated; and means for identifying the external apparatus using the session identifier.

42. The apparatus of claim 41, wherein said means for creating comprises:

means for generating an intermediate sequence for the session identifier;

means for comparing the intermediate sequence with other intermediate sequences of currently active session identifiers to determine uniqueness; and means for encoding the intermediate sequence into the session identifier.

43. The apparatus of claim 42, wherein the intermediate sequence is derived in part from the authentication information of the external apparatus.

44. The apparatus of claim 42, wherein the intermediate sequence comprises a randomly generated sequence.

* * * * *

UNITED STATES PATENT AND TRADEMARK OFFICE
CERTIFICATE OF CORRECTION

PATENT NO.    : 6,742,126 B1
DATED         : May 25, 2004
INVENTOR(S)   : Mann et al.

It is certified that error appears in the above-identified patent and that said Letters Patent is hereby corrected as shown below:

Column 4,
Line 2, after "session identifier" replace "appended." with -- appender. --.

Column 5,
Line 32, between "i" and "j" delete " ".
Line 52, between "Y" and "Z" delete " ".

Column 6,
Line 28, replace "ASCH1" with -- ASCII --.
Line 45, between "5" and "6" delete " ".

Signed and Sealed this

Eighteenth Day of October, 2005

JON W. DUDAS
*Director of the United States Patent and Trademark Office*